United States Patent
Fitzgibbon et al.

(10) Patent No.: US 11,328,424 B1
(45) Date of Patent: May 10, 2022

(54) SYSTEMS AND METHODS FOR MONITORING A MOVABLE BARRIER

(71) Applicant: The Chamberlain Group, Inc., Oak Brook, IL (US)

(72) Inventors: James Fitzgibbon, Batavia, IL (US); Thomas Jason Grinter, Wheaton, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 459 days.

(21) Appl. No.: 16/535,738

(22) Filed: Aug. 8, 2019

(51) Int. Cl.
| | |
|---|---|
| *G06T 7/11* | (2017.01) |
| *G06T 7/12* | (2017.01) |
| *G06T 7/174* | (2017.01) |
| *E05F 15/73* | (2015.01) |
| *G06T 7/73* | (2017.01) |

(52) U.S. Cl.
CPC ............... *G06T 7/11* (2017.01); *E05F 15/73* (2015.01); *G06T 7/12* (2017.01); *G06T 7/174* (2017.01); *G06T 7/73* (2017.01); *E05F 2015/767* (2015.01)

(58) Field of Classification Search
CPC ... G06T 7/11; G06T 7/12; G06T 7/174; G06T 7/73; E05F 15/73; E05F 2015/76
See application file for complete search history.

(56) References Cited

U.S. PATENT DOCUMENTS

| | | | | |
|---|---|---|---|---|
| 6,634,408 B2 * | 10/2003 | Mays | ................. | G07C 9/00309 |
| | | | | 160/188 |
| 7,657,062 B2 | 2/2010 | Pilu | | |
| 8,558,885 B2 | 10/2013 | Fitzgibbon | | |
| 9,286,678 B2 | 3/2016 | Zhu | | |
| 9,563,951 B2 | 2/2017 | Okouneva | | |
| 10,029,622 B2 | 7/2018 | Brown | | |
| 11,187,026 B2 * | 11/2021 | Cate | ........................ | E05F 15/40 |
| 11,200,769 B2 * | 12/2021 | Farber | ...................... | G07C 9/28 |
| 2005/0074140 A1 * | 4/2005 | Grasso | ............... | G08B 13/1968 |
| | | | | 382/103 |

(Continued)

OTHER PUBLICATIONS

Apple; "Correct shaky video in Final Cut Pro"; https://support.apple.com/guide/final-cut-pro/correct-shaky-video-verbacf92b/mac; Believed to be publicly available before the filing date of Aug. 8, 2019; pp. 1-4.

(Continued)

*Primary Examiner* — Bobbak Safaipour
(74) *Attorney, Agent, or Firm* — Fitch, Even, Tabin & Flannery LLP

(57) ABSTRACT

Systems, apparatuses, and methods are provided herein that may be used to monitor a movable barrier operated by a movable barrier operator. In some embodiments, a system includes a camera configured to capture frames, and a control circuit. The camera has a field of view that defines a boundary of each of the frames. The control circuit is configured to receive a first frame, identify a stationary object in the first frame, and define a region of interest "ROI" relative to the stationary object in the first frame. The control circuit is further configured to receive a second frame, identify the stationary object in the second frame, determine whether at least a portion of the ROI is outside of the second frame, and cause the movable barrier operator to enter a failsafe mode upon the at least a portion of the ROI being outside of the second frame.

16 Claims, 8 Drawing Sheets

(56) References Cited

U.S. PATENT DOCUMENTS

| | | | |
|---|---|---|---|
| 2005/0207616 A1* | 9/2005 | Brad | E05F 15/43 382/103 |
| 2016/0350921 A1 | 12/2016 | Bataller | |
| 2017/0295358 A1 | 10/2017 | Cabral | |
| 2018/0189532 A1 | 7/2018 | Bataller | |
| 2018/0278925 A1 | 9/2018 | Okouneva | |
| 2019/0206042 A1* | 7/2019 | Janssens | G06T 7/13 |
| 2020/0071983 A1* | 3/2020 | Ottmann | E05F 15/73 |
| 2021/0047873 A1* | 2/2021 | Cate | E05F 15/686 |

OTHER PUBLICATIONS

Apple; "iMovie for Mac: Stabilize shaky clips"; https://support.apple.com/kb/PH22925?locale=en US; Sep. 15, 2018; pp. 1-2.

Autostitch; "AutoStitch: a new dimension in automatic image stitching"; http://matthewalunbrown.com/autostitch/autostitch.html; Jun. 24, 2019; pp. 1-3.

Hugin; "Hugin—Panorama photo stitcher"; http://hugin.sourceforge.net/; Aug. 3, 2019; pp. 1-5.

Liftmaster; Residential DC Vehicular Slide Gate Operator; Model RSL12UL; 48 Pages, © 2018.

Liftmaster; Residential DC Vehicular Swing Gate Operator; Model RSL12UL; 52 Pages, © 2018.

Microsoft; "Image Composite Editor"; https://www.microsoft.com/en-us/research/project/image-composite-editor/; Mar. 9, 2019; pp. 1-6.

Sketchar; "The first assistant for drawing using augmented reality powered by AI"; https://sketchar.tech/; Believed to be publicly available before the filing date of Aug. 8, 2019; pp. 1-3.

Wikipedia; "Machine vision"; https://en.wikipedia.org/wiki/Machine_vision; Oct. 2, 2018; pp. 1-7.

Wikipedia; "PlayStation Move"; https://en.wikipedia.org/wiki/PlayStation_Move; Jul. 28, 2019; pp. 1-16.

Wikipedia; "PlayStation VR"; https://en.wikipedia.org/wiki/PlayStation_VR; Aug. 6, 2019; pp. 1-7.

Wikipedia; "Pokemon Go"; https://en.wikipedia.org/wiki/Pok%C3%A9mon_Go; Aug. 4, 2019; pp. 1-48.

* cited by examiner

SYSTEMS AND METHODS FOR MONITORING A MOVABLE BARRIER

FIELD

This disclosure relates generally to movable barriers and, more particularly, relates to monitoring a movable barrier with a camera.

BACKGROUND

Movable barriers are common in residential and commercial settings. For example, a homeowner or business may have a movable barrier, such as a gate, controlling access to a driveway. While movable barriers are helpful in controlling access to a property, the movable barriers may be closed prematurely and damage a vehicle in the driveway.

Currently, systems exist that seek to prevent operation of a movable barrier if an obstacle is in the way of the movable barrier (i.e., within the path of travel of the movable barrier). One such system is a loop detector. Loop detectors generally consist of wire loops located in the ground proximate to a movable barrier. Metallic objects, such as vehicles, disrupt the magnetic field of the loop detector and are so detected by the loop detector. While loop detectors are generally effective for detecting vehicles, they do have drawbacks. For example, loop detectors are generally unable to detect objects that do not include significant metallic material and may have difficulty detecting smaller metallic objects, such as motorcycles. Further, loop detectors can be expensive, and difficult, to install. For example, to install a loop detector in an existing system, the concrete or other ground covering may need to be cut or excavated to install the loop detector.

DETAILED DESCRIPTION

Generally speaking, pursuant to various embodiments, systems, apparatuses and methods are provided herein that may be used to monitor a region of interest ("ROI") with respect to a movable barrier operated by a movable barrier operator. In some embodiments, a system is provided that comprises a camera configured to capture images of the ROI in a plurality of frames (i.e., image frames). The camera has a field of view ("FOV") that defines the boundary of each of the plurality of frames. The system further includes a control circuit configured to be communicatively coupled to the camera and to the movable barrier operator. The control circuit is configured to receive a first frame of the plurality of frames from the camera, identify a stationary object in the first frame (i.e., an object of reference), and define a ROI relative to the reference stationary object in the first frame. The control circuit is further configured to receive a second frame of the plurality of frames from the camera, identify the stationary object in the second frame, determine whether at least a portion of the ROI defined relative to the reference stationary object is outside of the second frame, and cause the movable barrier operator to enter a failsafe mode upon the at least a portion of the ROI defined relative to the stationary object being outside of the second frame.

In one aspect of the present disclosure, systems, methods, and apparatuses are provided that utilize a camera to monitor the ROI. The camera captures frames having boundaries that are defined by a FOV of the camera. The system defines a ROI relative to a stationary object in the frames. If the ROI is at least partially outside of the FOV, the system can cause the movable barrier operator to enter a failsafe mode (e.g., a mode in which the movable barrier will not operate). Put simply, if the ROI cannot be reliably monitored (e.g., a portion, or all, of the ROI is outside of the FOV), the system reduces the risk of the movable barrier impacting an obstacle by causing the movable barrier operator to enter a failsafe mode. For example, the camera may move due to environmental factors, such as wind or collision with an object, that causes the FOV of the camera to change. The discussion of FIG. 1 provides an overview of an example of such a system.

Figure 1:
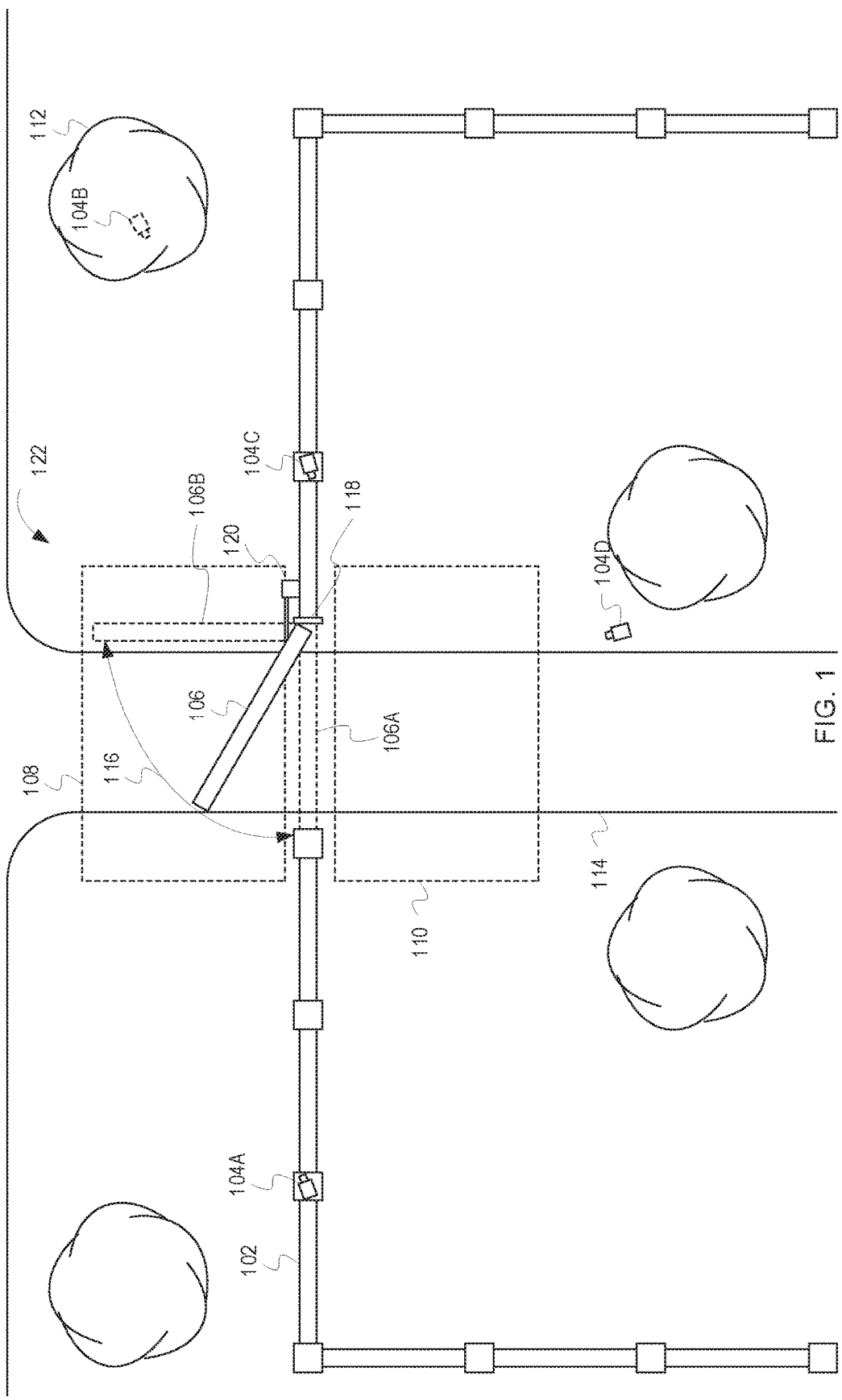
FIG. 1 is a plan view of an entrance to a property including an example first region of interest 108 and an example second region of interest 110 monitored by cameras 104A-104D.

FIG. 1 is a plan view of an entrance to a property (e.g., a residence, such as a single-family home or multi-resident community, or a commercial property) including a first region of interest 108 and a second region of interest 110 monitored by cameras 104A-104D. The entrance includes a fence 102, a driveway 114 connected to a road, and trees 112. The fence 102 includes a movable barrier 106 operated by a movable barrier operator 120. The movable barrier 106 is operable between a first position 106A (e.g., a closed position) and a second position 106B (e.g., an open position), as indicated by an arrow 116. The movable barrier 106 is monitored by cameras 104A-104D. As depicted in FIG. 1, a first camera 104A is mounted on a fence post of the fence 102, a second camera 104B is mounted on the tree 112, a third camera 104C is mounted on another fence post of the fence 102, and a fourth camera 104D is mounted near the driveway 114. Although FIG. 1 includes four cameras 104A-104D, one or more cameras may be used. In some embodiments, more than one camera can be used to monitor multiple regions of interest (as described below), provide a greater FOV, and/or redundancy as desired.

Figure 2A:
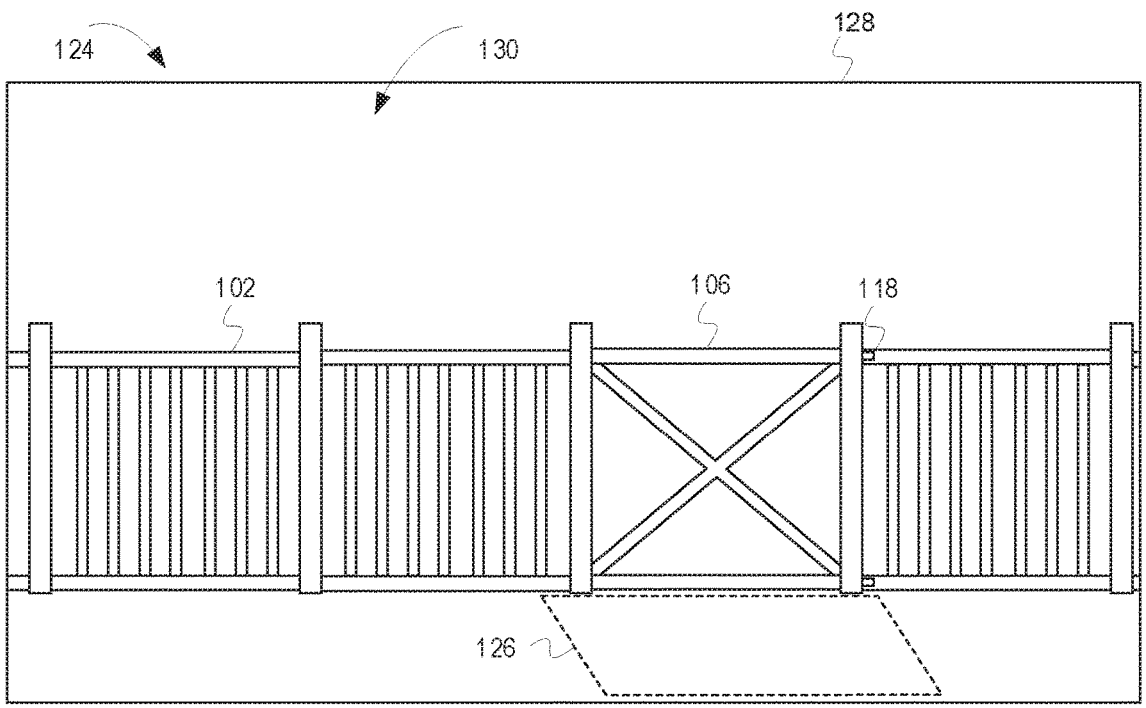
FIG. 2A is a representative view of an example first frame 124 provided by a camera.
Figure 2B:
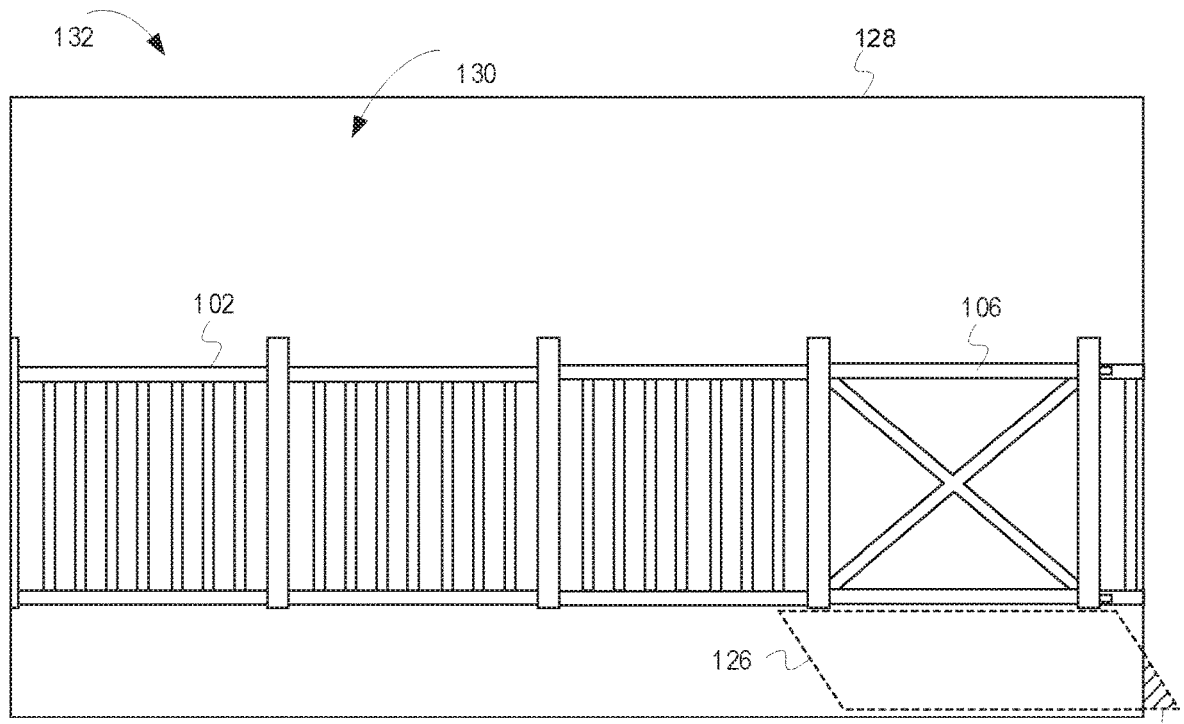
FIG. 2B is a representative view of an example second frame 132 provided by a camera.

The cameras 104A-104D capture images of their respective FOVs (as described in more detail with respect to FIGS. 2A and 2B). For the ease of discussion, the following actions will be described with respect to the first camera 104A, although it is understood that each of the cameras 104A-

104D may be operated similarly. One or more ROIs are defined relative to a stationary object in the FOV. For example, as depicted in FIG. 1, the first camera 104A captures images that include two ROIs: the first ROI 108 and the second ROI 110. The stationary object may be any suitable object such as a single object or plurality of objects. The stationary object may include a preexisting marker (e.g., one of the trees 112, a fence post, a gate hinge 118, a rock, etc.) or a marker added during installation (e.g., markings on the ground with paint, stakes, and/or flags.). In one embodiment, the object is stationary in that it does not move significantly with respect to the movable barrier 106 during normal operation of the movable barrier 106. While FIG. 1 includes two ROIs (the first ROI 108 and the second ROI 110), one or more ROIs may be utilized. For example, only the first ROI 108 may be monitored for objects in the path of the movable barrier 106.

The first camera 104A monitors one or more of the first ROI 108 and the second ROI 110 to determine whether an obstacle is located within one or more of the first ROI 108 and the second ROI 110. If an object is located within one of the ROIs, the movable barrier operator can enter a failsafe mode (e.g., by stopping the movable barrier 106, opening the movable barrier 106, closing the movable barrier 106, etc.). However, if some, or all, of one or both of the ROIs is outside of the FOV of the first camera 104A, it may be difficult, if not impossible, to determine whether an obstacle is within one of the ROIs. In this case, monitored operation of the movable barrier 106 may not be possible. Consequently, when some, or all, of one or both of the first ROI 108 and the second ROI 110 are outside of the FOV of the first camera 104A, the movable barrier operator 120 enters the failsafe mode.

While the discussion of FIG. 1 provides an overview of a system 122 for monitoring a ROI with respect to a movable barrier, the discussion of FIGS. 2A and 2B provides additional detail regarding fields of view and regions of interest with respect to a stationary object.

FIG. 2A is a representative view of a first frame 124 provided by a camera. The first frame 124 is captured by the camera and includes a barrier (e.g., a fence 102), a movable barrier 106 (e.g., a gate, door, garage door, etc.), and a ROI 126. The boundary 128 of the first frame 124 defines a FOV 130 of the first frame 124. The ROI 126 is defined relative to a stationary object, such as a hinge 118 of the movable barrier 106. Though the hinge 118 may not be stationary in that it moves (e.g., rotates), the hinge 118 is stationary in that its position within the frame should be consistent if the camera does not move. Further, it should be noted that, in some embodiments, the stationary object may be multiple objects or a collection of objects. The ROI 126 can be defined by any suitable technique or method. For example, in one embodiment, the hinge 118 can be defined by a coordinate (e.g., a cartesian or polar coordinate) and the ROI 126 can be defined based on one or more distances away from the stationary object. In the example provided in FIG. 2A, the ROI 126 is rectangular. Accordingly, the ROI 126 can be defined using a set of four distances from the stationary object. The distances can be any suitable measurement, such as physical distance measurements (e.g., centimeters, meters, etc.) or digital distances (e.g., a number of pixels). As one example, if the location of the stationary object is (X, Y), the four distances can be (X+J, Y+K), (X+L, Y+K), (X+J, Y+M), and (X+L, Y+M), where J, K, L, and M represent the distances from the stationary object (described in more detail with respect to FIG. 7). Though the ROI 126 in FIG. 2A is depicted as being rectangular, embodiments are not so limited, and the ROI 126 can take any suitable shape (e.g., circular, triangular, etc.) and can include as many points as desired as well as straight and/or curved lines. Additionally, the shape of the ROI 126 can be user defined and/or system defined (e.g., based on computer vision techniques). As depicted in FIG. 2A, the ROI 126 is completely within the FOV of the camera (i.e., within the boundary 128 of the first frame 124).

FIG. 2B is a representative view of a second frame 132 provided by the camera. Like the first frame 124 of FIG. 2A, the second frame 132 is captured by the camera and includes a barrier (i.e., the fence 102), a movable barrier 106, and a ROI 126. The boundary 128 of the second frame 132 defines a FOV 130 of the second frame 132. Based on comparison of FIGS. 2A and 2B, the camera has shifted between FIGS. 2A and 2B and thus the FOV 130 of the second frame 132 is different than the FOV 130 of the first frame 124. For example, the camera may have been moved by an environmental condition (e.g., wind), an animal, a person, contact with an object, etc. As depicted in FIG. 2B, a portion 134 of the ROI 126 is outside of the FOV 130. That is, the portion 134 of the ROI 126 extends beyond a boundary 128 of the second frame 132. Because the portion 134 of the ROI 126 is outside of the FOV 130, the camera may not be able to completely or adequately monitor the ROI 126. Consequently, it may not be reliably known whether there are obstacles in the path of travel of the movable barrier 106.

In some embodiments, when the entire ROI 126 is not within the FOV 130 (i.e., at least a portion of the ROI 126 is outside of the FOV 130), the movable barrier operator associated with the camera enters a failsafe mode. When the movable barrier operator enters the failsafe mode, the movable barrier operator may cause the movable barrier 106 to stop, open, close, etc. The failsafe mode can operate in any manner desired. For example, if the primary goal of the movable barrier 106 is security, the movable barrier operator may cause the movable barrier 106 to close when the failsafe mode is entered. Alternatively, if the primary goal is access, the movable barrier operator can cause the movable barrier 106 to stop or open the movable barrier 106 when the movable barrier operator enters the failsafe mode.

Figure 3:
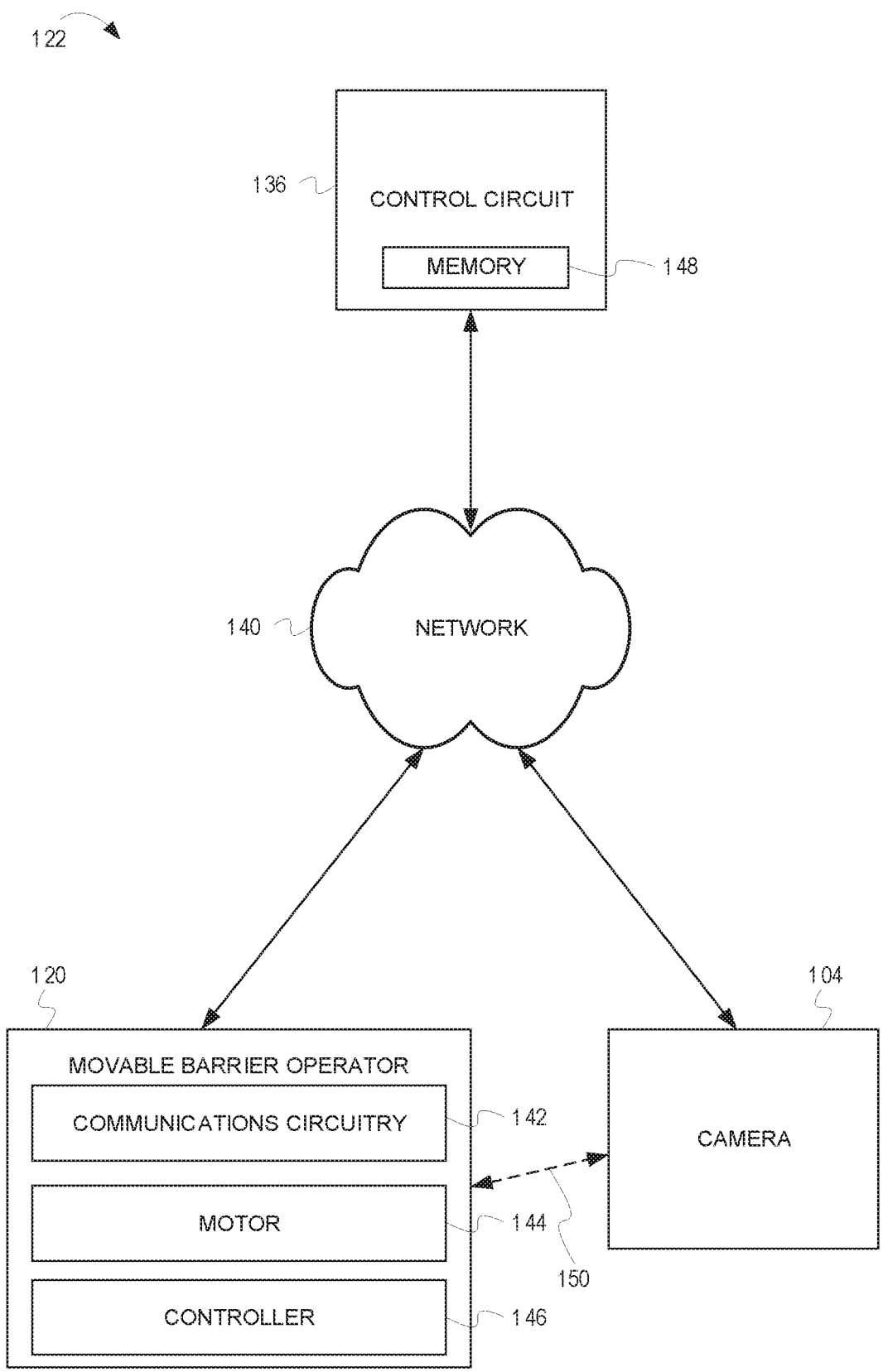
FIG. 3 is a block diagram of an example system 122 for monitoring a region of interest with respect to a movable barrier operated by a movable barrier operator 120 wherein a control circuit 136 is separate from the movable barrier operator 120 and a camera 104.
Figure 4:
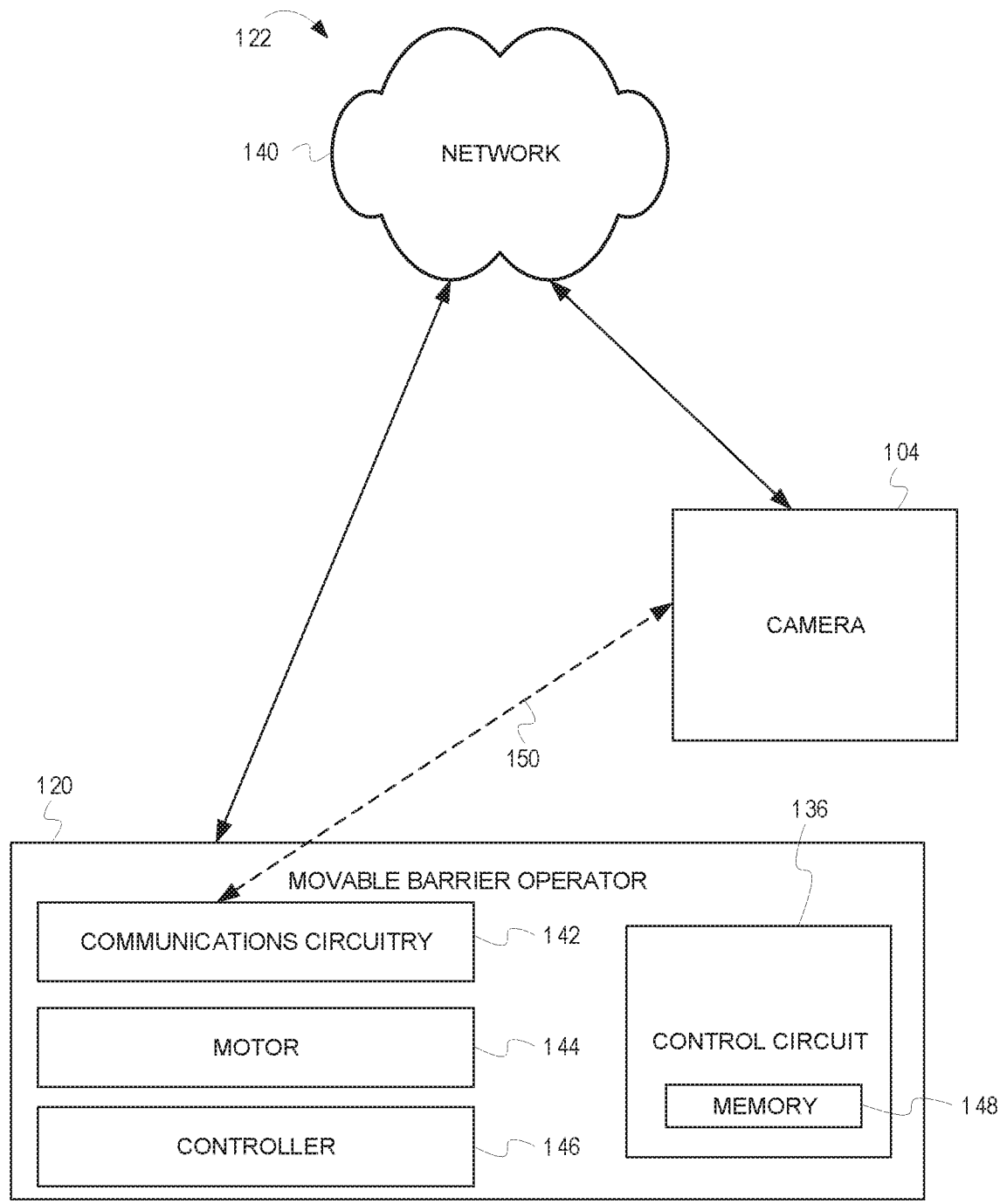
FIG. 4 is a block diagram of another example system 122 for monitoring a region of interest with respect to a movable barrier operated by a movable barrier operator 120 wherein a control circuit 136 is integrated with the movable barrier operator 120.
Figure 5:
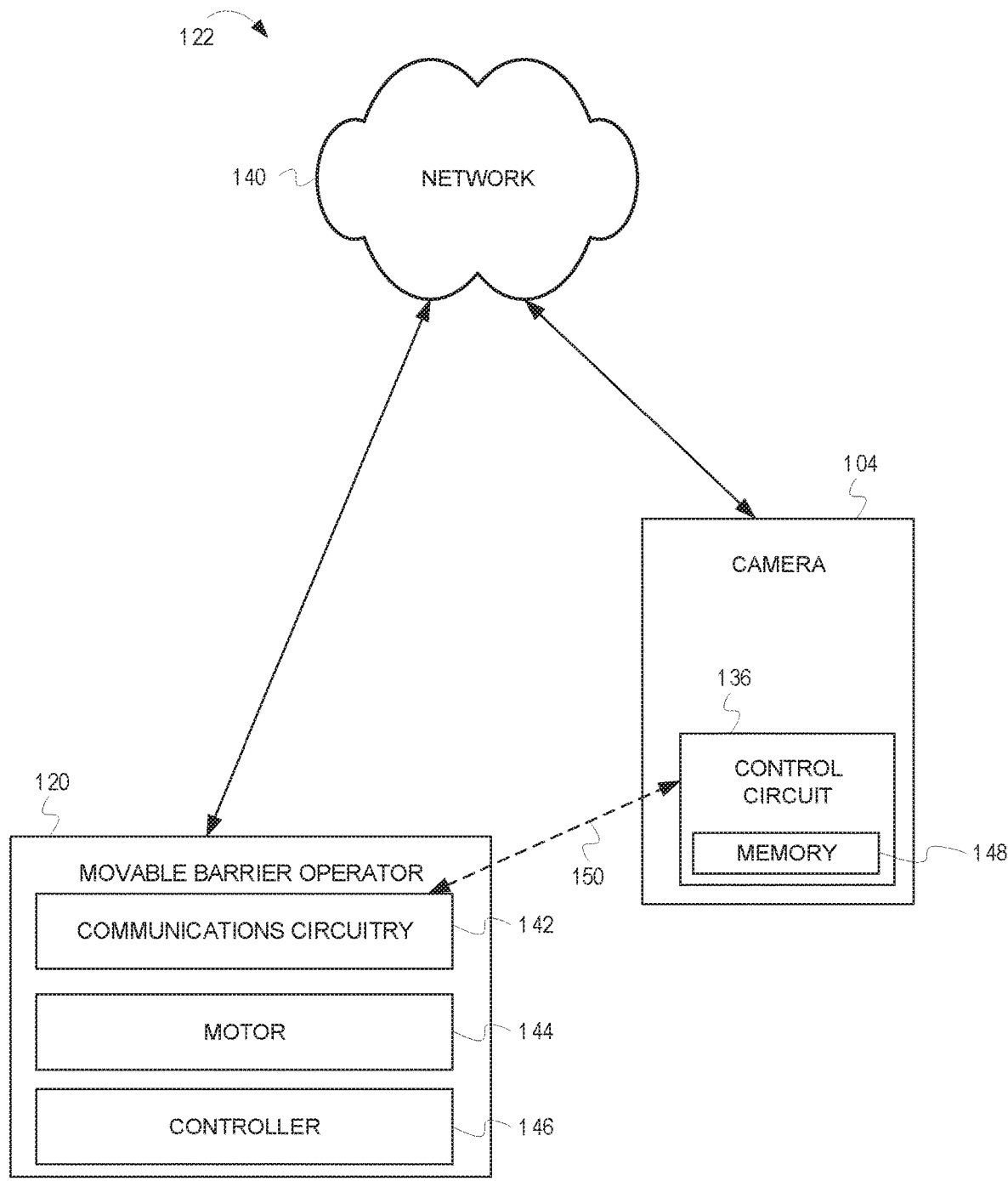
FIG. 5 is a block diagram of yet another example system 122 for monitoring a region of interest with respect to a movable barrier operated by a movable barrier operator 120 wherein a control circuit 136 is integrated with a camera 104.

While the discussion of FIGS. 2A and 2B provides additional detail regarding FOVs and ROIs with respect to a stationary object, the discussion of FIGS. 3-5 provides additional detail regarding systems for monitoring a ROI with respect to a movable barrier operated by a movable barrier operator.

FIG. 3 is a diagram of an example system 122 for monitoring a region of interest with respect to a movable barrier operated by a movable barrier operator 120 wherein a control circuit 136 is separate from the movable barrier operator 120 and a camera 104. The control circuit 136, movable barrier operator 120, and the camera 104 are communicatively coupled via a network 140. Accordingly, the network 140 can be of any suitable type. For example, the network 140 may include one or more networks such as a local area network (LAN) and/or wide area network (WAN), such as the Internet, and can include wired and/or wireless links. In some embodiments, the network 140 may not be a "network" in the traditional sense. For example, in some embodiments, the network 140 may be a direct connection (i.e., a wireless (e.g., Bluetooth, Zigbee, etc.) or wired connection) between components. Such a direct or peer-to-peer connection is depicted by a dashed arrow 150.

The movable barrier operator 120 includes communications circuitry 142, a motor 144, and a controller 146. The communications circuitry 142 may include a receiver, transmitter, and/or transceiver and can be of any suitable type (e.g., wired and/or wireless) and communicate via any suitable technology (e.g., based on the IEEE 802.11 standard, Bluetooth, Zigbee, etc.). The motor 144 is configured to move an associated movable barrier. The controller 146 controls the motor 144 and/or the communications circuitry 142. The camera 104 is configured to capture frames that are each defined by a FOV of the camera 104. The camera 104 may capture still images and/or video, as desired.

The control circuit 136 may include a fixed-purpose hard-wired hardware platform (including but not limited to an application-specific integrated circuit (ASIC), a field-programmable gate array (FPGA), and the like) or can comprise a partially or wholly-programmable hardware platform (including but not limited to microcontrollers, microprocessors, logic circuitry and the like). These architectural options for such structures are well known and understood in the art and require no further description here. The control circuit 136 is configured (for example, by using corresponding programming as will be well understood by those skilled in the art) to carry out one or more of the operations, actions, and/or functions described herein.

In one embodiment, the control circuit 136 includes or is operably coupled to a memory 148. The memory 148 may be integral to the control circuit 136 or may be physically discrete (in whole or in part) from the control circuit 136 as desired. This memory 148 may also be local with respect to the control circuit 136 (where, for example, both share a common circuit board, chassis, power supply, and/or housing) or may be partially or wholly remote with respect to the control circuit 136 (where, for example, the memory 148 is physically located in another facility, metropolitan area, or even country as compared to the control circuit 136).

The memory 148 may serve, for example, to non-transitorily store the computer-readable instructions that, when executed by the control circuit 136, cause the control circuit 136 to operate as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory—ROM) as well as volatile memory (such as an erasable programmable read-only memory—EPROM).

The control circuit 136 receives the frames from the camera 104. The control circuit 136 identifies a stationary object in the frames and defines a ROI with relative to the stationary object. In some embodiments, during an initialization or setup process, a stationary object is selected (e.g., by a human operator or the control circuit 136). The stationary object can be any suitable object (i.e., an object that is stationary with respect to the movable barrier when the movable barrier is not being operated). This stationary object is used throughout the process to define and/or identify the ROI in subsequent frames.

As the control circuit 136 receives the frames, the control circuit 136 monitors the ROI. If the camera 104 moves, the FOV of the camera 104 may change. Because the camera 104 is moving with respect to the stationary object, and the ROI defined with respect to the stationary object, the ROI moves between the frames. That is, although the stationary object does not move, the stationary object appears to "move" from frame-to-frame when the camera 104 moves. The control circuit 136 monitors the ROI to ensure that the ROI is within the frame. If the ROI moves from the frame (i.e., if at least a portion of the ROI is outside of the frame), the control circuit 136 causes the movable barrier operator 120 to enter the failsafe mode. In some embodiments, the control circuit 136 determines that at least a portion of the ROI is outside of the frame when the ROI is within a threshold distance of a boundary of the FOV. That is, although the ROI may be within the frame, if the ROI is too close to a boundary of the FOV, the control circuit 136 may still cause the movable barrier operator 120 to enter the failsafe mode. In one embodiment, the control circuit 136 causes the movable barrier operator 120 to enter the failsafe mode by transmitting a control signal to the communications circuitry 142 instructing the movable barrier operator 120 to enter the failsafe mode. The controller 146 receives the control signal, causing the movable barrier operator 120 to enter the failsafe mode.

In some embodiments, the control circuit 136 monitors the FOV from frame-to-frame. For example, the control circuit 136 can associate a location of the stationary object within the first frame and a location of the stationary object within a second frame. If the location of the stationary object in the first frame is different than the location of the stationary object in the second frame, the control circuit 136 determines that the FOV of the camera 104 has changed. In some embodiments, the control circuit 136 may only make determinations as to whether the ROI is within the frame if the location of the stationary object changes from one frame to the next. That is, if the location of the stationary object does not change between the frames, then the FOV of the camera 104 has not changed. If the ROI was within the first frame and the FOV of the camera 104 has not changed, the ROI should be within the second frame.

If the FOV of the camera 104 has changed between frames (e.g., a first frame and a second frame), the control circuit 136 translates the ROI between the frames. For example, if the stationary object is at a first location in the first frame and a second location in the second frame, the control circuit 136 translates the ROI based on the first location and the second location. Returning to the example provided above, if the stationary object is defined in a coordinate system, the control circuit 136 translates the coordinates of the ROI based on the movement of the stationary object from the first location to the second location. This translation can be linear and/or rotational, dependent upon the movement of the camera 104 (i.e., the manner in which the stationary object moves between the frames).

In some embodiments, the control circuit 136 may transmit a notification when the movable barrier operator 120 enters the failsafe mode. For example, upon causing the movable barrier operator 120 to enter the failsafe mode, the control circuit 136 may generate and transmit a notification indicating that the movable barrier operator 120 has entered the failsafe mode. The control circuit 136 may transmit the notification to any suitable party, such as a property owner, a technician, an installer of the movable barrier operator, and/or a monitoring company (e.g., a property security monitoring company). Additionally, the notification can include any desired information, such as an identification of the movable barrier operator 120, a location (e.g., address) of the movable barrier operator, a timestamp, one or more of the frames, an indication of the position of the movable barrier (e.g., open, closed, partially open or closed). The control circuit 136 may transmit the notification to a user device via the network 140. The user device can be any suitable device, such as a telephone, a smartphone, a computer, a tablet, etc. Accordingly, the notification may take any suitable form, such as a simple message service (SMS)

message, a multimedia message service (MMS) message, a phone call, an email, a push notification, etc.

While the discussion of FIG. 3 provides additional detail regarding a system for monitoring a ROI with respect to a movable barrier operated by a movable barrier operator where the control circuit is separate from a movable barrier operator and a camera, the discussion of FIG. 4 provides additional detail regarding such a system wherein the control circuit is integrated with the movable barrier operator.

FIG. 4 is a diagram of a system 122 for monitoring a region of interest with respect to a movable barrier operated by a movable barrier operator 120 wherein a control circuit 136 is integrated with the movable barrier operator 120. The movable barrier operator 120 includes communications circuitry 142, a motor 144, and a controller 146. Unlike the system depicted in FIG. 3, the movable barrier operator 120 of the system 122 includes the control circuit 136. Consequently, the movable barrier operator 120, via the control circuit 136, processes frames received from the camera 104 to determine if the ROI is within the frames. In such embodiments, the controller 146 and the control circuit 136 may be a single device. For example, the controller 146 can perform the tasks of the control circuit 136 in embodiments in which the control circuit 136 is integrated with the movable barrier operator 120. Further, the movable barrier operator 120 can include the image-processing instructions in the memory 148.

While the discussion of FIG. 4 provides additional detail regarding a system for monitoring a ROI with respect to a movable barrier operated by a movable barrier operator where the control circuit is integrated with the movable barrier operator, the discussion of FIG. 5 provides additional detail regarding such a system when the control circuit is integrated with the camera.

FIG. 5 is a diagram of a system 122 for monitoring a region of interest with respect to a movable barrier operated by a movable barrier operator 120 wherein a control circuit 136 is integrated with a camera 104. The movable barrier operator 120 includes communications circuitry 142, a motor 144, and a controller 146. Unlike the system depicted in FIGS. 3 and 4, the camera 104 of the system 122 includes a control circuit 136. Consequently, the camera 104, via the control circuit 136, processes the frames to determine if the ROI is within the frames. In embodiments in which the control circuit 136 is integrated with the camera 104, the control circuit 136 can control the camera 104 and the camera 104 can include the image-processing instructions in the memory 148.

Figure 6:
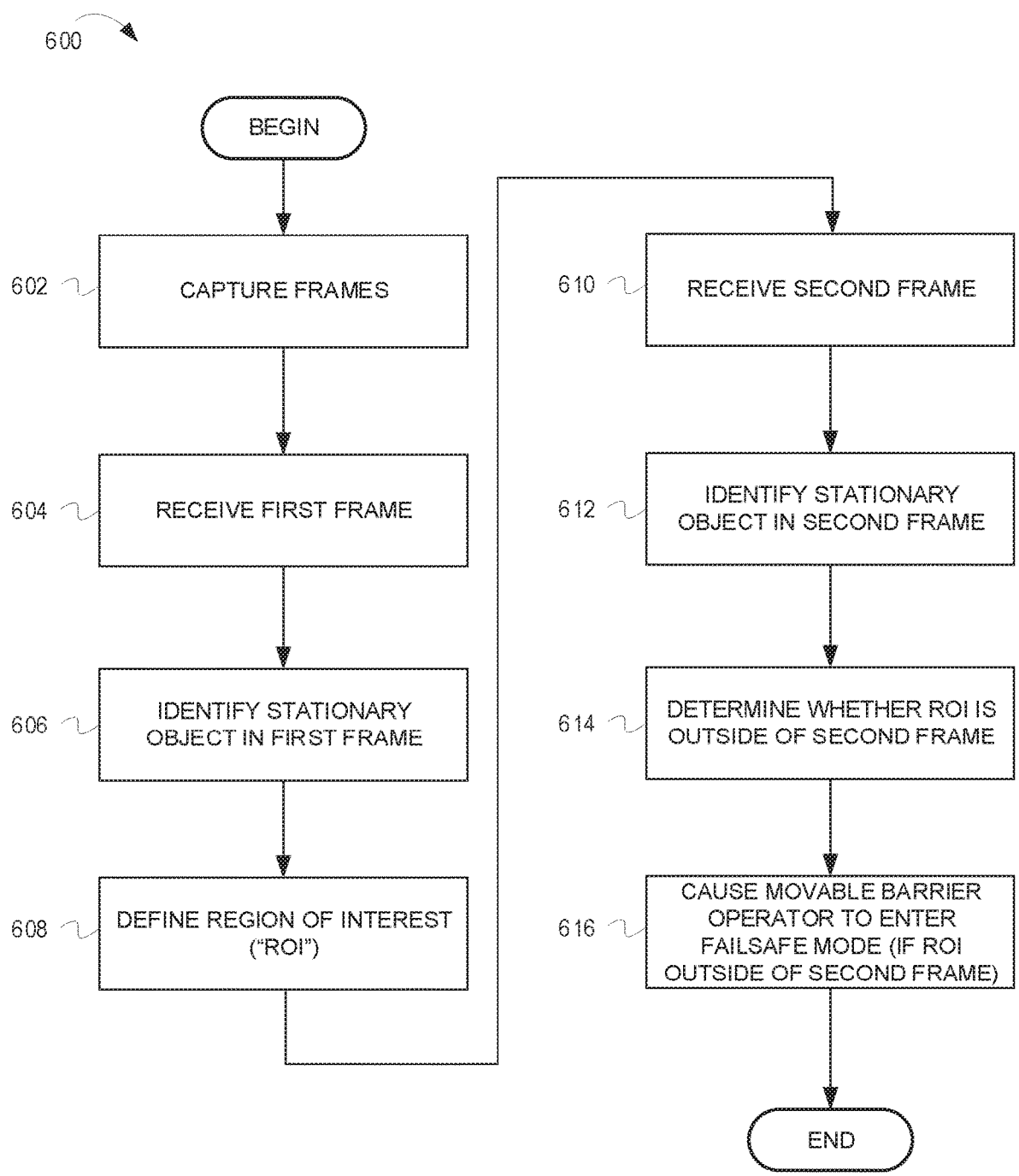
FIG. 6 is a flow chart depicting example operations for monitoring a region of interest with respect to a movable barrier operated by a movable barrier operator.

While the discussion of FIGS. 3-5 provides additional details regarding different systems for monitoring a ROI with respect to a movable barrier operated by a movable barrier operator, the discussion of FIG. 6 describes example operations of such systems.

FIG. 6 is a flow chart depicting an example method 600 for monitoring a region of interest with respect to a movable barrier operated by a movable barrier operator.

At operation 602, frames (i.e., image frames) are captured by a camera. The camera has a FOV that defines the boundary of each of the plurality of frames. The camera may be of any suitable type, such as a camera capable of capturing digital still images and/or digital video and can capture images at any suitable rate (e.g., one image per second, video at thirty-two frames per second, etc.). The camera is positioned to encompass in its FOV a ROI adjacent a movable barrier. In some embodiments, the camera can include multiple cameras.

At operation 604, a first frame is received. For example, a control circuit may receive the first frame from the camera. As discussed with respect to FIGS. 3-5, the control circuit may be separate from, or integrated with, a movable barrier operator and/or the camera. Dependent upon the type of system, the control circuit can receive the first frame directly or indirectly such as over a network. The first frame need not be "first" in the sense that it is the initial frame captured. Rather, the term "first frame" is used to indicate that the first frame is captured before a second frame, whether immediately preceding the second frame, simply preceding the second frame, or a reference frame to which the second frame is compared.

Figure 8:
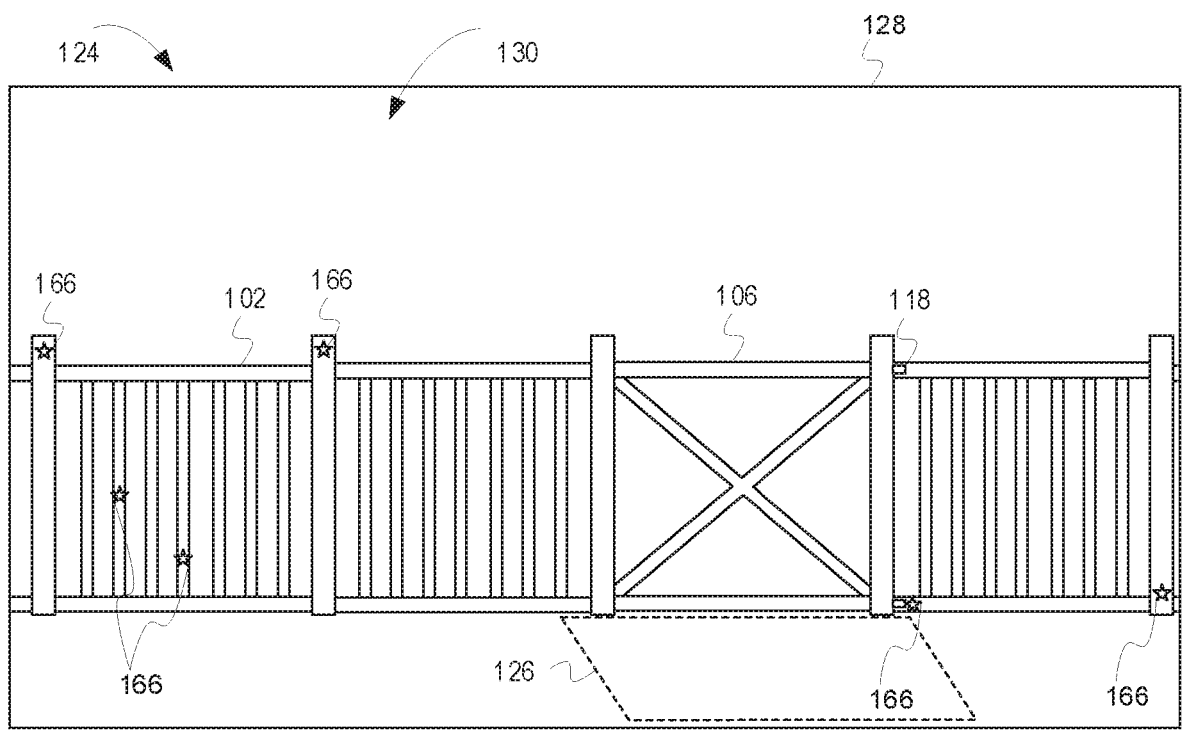
FIG. 8 is a representative view of a frame 124 including points 166 that are stationary relative to a movable barrier 106.

At operation 606, a stationary object is identified in the first frame. For example, the control circuit may identify the stationary object in the first frame. The stationary object is an object that may be used to define the region of interest. For example, the stationary object can be any object that is stationary with respect to the movable barrier when the movable barrier is not being operated. In one embodiment, the stationary object is identified during an initialization or setup procedure. For example, the control circuit can "learn" the stationary object for later detection. In other embodiments, the control circuit identifies stationary object upon receipt of the first frame without a required learning procedure. That is, the control circuit selects the stationary object in the first frame. The discussion of FIG. 8 provides additional information regarding identification and selection of one or more stationary objects.

At operation 608, a ROI is defined. For example, the control circuit can define the ROI. The ROI is defined relative to the stationary object. The ROI can be defined relative to the stationary object in any suitable manner. In one embodiment, the control circuit can define the ROI based on, for example, the travel path of the movable barrier, one or more distances from the stationary object, based on other stationary objects relative to the stationary object, lines or markings, etc.

At operation 610, a second frame is received. For example, the control circuit can receive the second frame from the camera. The second frame is a frame captured by the camera subsequent to capture of the first frame. The second frame need not be the second in a series of frames that is captured. Rather, the second frame is "second" in that it is captured subsequent to the first frame. Additionally, the second frame need not be the frame that is captured immediately after the first frame.

At operation 612, the stationary object is identified in the second frame. For example, the control circuit can identify the stationary object in the second frame. The control circuit can identify the stationary object in the second frame in any suitable manner. For example, in one embodiment, the control circuit identifies the stationary object in the same via image recognition. That is, the control circuit recognizes objects in the second frame and identifies the stationary object based on a comparison or matching of objects in the second frame to those of previous frames (e.g., the first frame, frames captured during an initialization or setup process).

At operation 614, it is determined whether the ROI is outside of the second frame. For example, the control circuit can determine whether the ROI is outside of the second frame. The ROI is defined relative to the stationary object. The control circuit may determine whether the ROI is outside of the second frame based on a translation. That is, if the stationary object has moved in the camera's FOV between the first frame and the second frame, the ROI may be translated based on this movement. For example, if the stationary object has "moved" six units between the first frame and the second frame, the control circuit translates the ROI by six units in the second frame. This translation can be linear and/or rotational. Though the stationary object has "moved" within in the frame, it is stationary with respect to objects depicted in the frame. In some embodiments, the control circuit determines that the ROI is outside of the second frame when at least a portion of the ROI is not within the second frame. Further, in some embodiments, the control circuit can determine that the ROI is outside of the second frame when the ROI is within a threshold distance away from a boundary of the second frame. The control circuit can determine that the ROI is outside of the frame based on a difference between the location of the stationary object in the first frame and the location of the stationary object in the second frame.

At operation 616, the movable barrier operator is caused to enter a failsafe mode upon a determination that at least a portion of the ROI is outside of the second frame. For example, the control circuit can cause the movable barrier operator to enter the failsafe mode. The failsafe mode may stop the movable barrier operator from moving, cause the movable barrier to open, or cause the movable barrier to close, as some examples.

Figure 7:
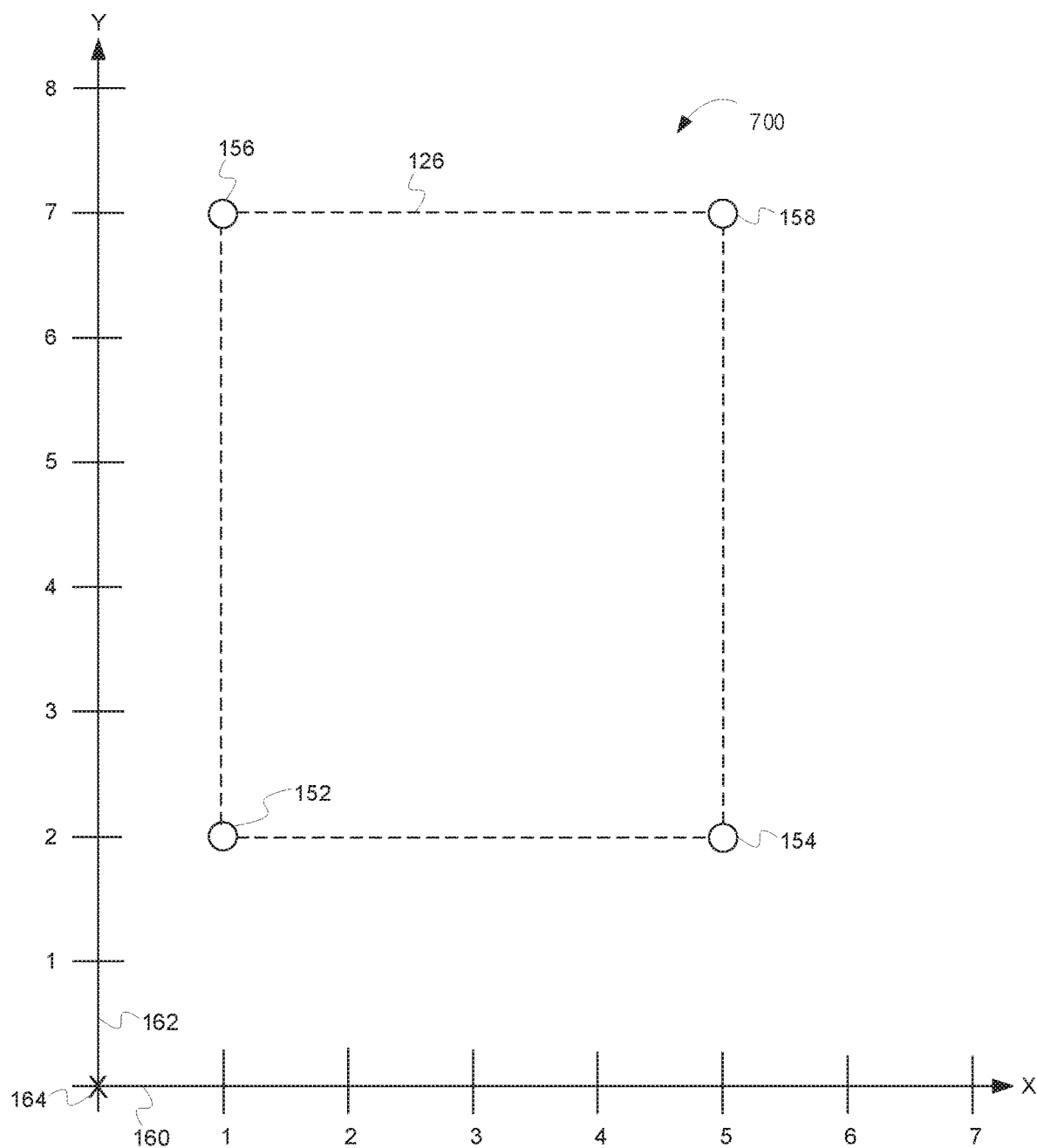
FIG. 7 is a coordinate system 700 depicting a region of interest 126 based on distances from a stationary object.

While the discussion of FIGS. 1-6 describes systems and methods for monitoring a ROI with respect to a movable barrier, the discussion of FIGS. 7 and 8 provides additional detail regarding defining a ROI and identifying stationary objects within a frame. Specifically, the discussion of FIG. 7 provides additional detail regarding defining a ROI based on distances from a stationary object.

FIG. 7 is a coordinate system 700 depicting a ROI 126 based on distances from a stationary object. The coordinate system 700 includes an X-Axis 160 and a Y-Axis 162. As previously discussed with respect to FIG. 2A, in some embodiments, the ROI 126 is defined using a set of distances from the stationary object. Continuing the example described in the discussion of FIG. 2A, if the location of the stationary object is (X, Y), the four corners can be (X+J, Y+K), (X+L, Y+K), (X+J, Y+M), and (X+L, Y+M), where J, K, L, and M represent the four distances from the stationary object. FIG. 7 presents a pictorial representation of such a ROI 126. Although the ROI 126 depicted in FIG. 7 is rectangular, embodiments are not so limited. For example, the ROI 126 can be any shape, include as many or as few points, and include straight and/or curved lines as desired. Accordingly, the ROI can be defined by greater or fewer than four distances or coordinates from the stationary object.

With respect to FIG. 7, because the ROI 126 is rectangular, the ROI 126 is defined by four distances from the stationary object. In FIG. 7, the stationary object is located at the origin (0, 0), as indicated by an "X" 164. The four distances define the region of interest via four points: a first point 152, a second point 154, a third point 156, and a fourth point 158. The first point 152 is located at (1, 2), the second point 154 is located at (5, 2), the third point 156 is located at (1, 7), and the fourth point 158 is located at (5, 7). That is, the first point 152 is one unit to the right of the stationary object and two units above the stationary object (i.e., located at (0+1, 0+2), the second point 154 is five units to the right of the stationary object and two units above the stationary object (i.e., located at (0+5, 0+2), the third point 156 is one unit to the right of the stationary object and seven units above the stationary object (i.e., located at (0+1, 0+7), and the fourth point 158 is five units to the right of the stationary object and seven units above the stationary object (i.e., (0+5, 0+7). In this example, X=0 and Y=0 (i.e., the stationary object is located at the origin), J=1, K=2, L=5, and M=7. Although FIG. 7 depicts the stationary object as located outside of the ROI 126, embodiments are not so limited. For example, the stationary object can be located within the ROI 126 (e.g., at the center of the ROI 126, near an edge of the ROI 126, etc.). Accordingly, the ROI 126, and not the stationary object, is what is the object of interest that is being monitored.

While the discussion of FIG. 7 provides additional detail regarding a defining a ROI based on distances from a stationary object, the discussion of FIG. 8 provides additional detail regarding identifying and/or selecting a stationary object.

FIG. 8 is a representative view of a frame 124 including points 166 that are stationary relative to a movable barrier 106. In some embodiments, the stationary object is identified and/or selected by the system (e.g., by the control circuit). As one example, the stationary object can be identified and/or selected by an algorithm that identifies one or more objects from frame-to-frame that do not move or are at least relatively stationary. For example, the identification of stationary objects may be performed using video analytics to analyze the frames. From frame-to-frame, the system identifies objects and tracks their locations within the frame and/or relative to other objects in the frame. The stationary objects can be selected from those objects that are identified or determined to not move from frame-to-frame. FIG. 8 includes numerous points 166 that are stationary relative to the movable barrier 106. These points 166 can include but are not limited to fence posts, slats, the hinge 118. Additionally or alternatively, an object recognition technique may be employed to identify or determine the one or more points 166. For example, when executed relative to one or more frames 124 an object recognition technique can be configured to output locations of items (e.g., such as tree trunks, fence posts, etc.) in the frames that have stationary characteristics.

In some embodiments, a system for monitoring a region of interest ("ROI") with respect to a movable barrier operated by a movable barrier operator comprises a camera configured to capture a plurality of frames, the camera having a field of view ("FOV") that defines the boundary of each of the plurality of frames and a control circuit configured to be communicatively coupled to the camera and to the movable barrier operator, wherein the control circuit is configured to receive a first frame of the plurality of frames from the camera, identify a stationary object in the first frame, define a ROI relative to the stationary object in the first frame, receive a second frame of the plurality of frames from the camera, identify the stationary object in the second frame, determine whether at least a portion of the ROI defined relative to the stationary object is outside of the second frame, and cause the movable barrier operator to enter a failsafe mode upon the at least a portion of the ROI defined relative to the stationary object being outside of the second frame.

In some embodiments, an apparatus and a corresponding method performed by the apparatus comprises capturing, via a camera, a plurality of frames, the camera having a field of view ("FOV") that defines the boundary of each of the plurality of frames, receiving, by a control circuit from the camera, a first frame of the plurality of frames, identifying, by the control circuit, a stationary object in the first frame, defining, by the control circuit, a region of interest ("ROI") relative to the stationary object in the first frame, receiving, by the control circuit from the camera, a second frame of the plurality of frames, identifying, by the control circuit, the stationary object in the second frame, determining, by the control circuit, whether at least a portion of the ROI defined relative to the stationary object is outside of the second frame, and causing, by the control circuit, the movable barrier operator to enter a failsafe mode upon the at least a portion of the ROI defined relative to the stationary object being outside of the second frame.

While there have been illustrated and described particular embodiments of the present invention, it will be appreciated that numerous changes and modifications will occur to those skilled in the art, and it is intended for the present invention to cover all those changes and modifications which fall within the scope of the appended claims. It is intended that the phrase "at least one of" be interpreted in the disjunctive sense. For example, the phrase "at least one of A and B" is intended to encompass only A, only B, or both A and B. Further, the term "based on" is intended to be open-ended and should be interpreted as being "based at least in part on."

What is claimed is:

1. A system for monitoring a region of interest ("ROI") with respect to a movable barrier operated by a movable barrier operator, the system comprising:
    a camera configured to capture a plurality of frames, the camera having a field of view ("FOV") that defines a boundary of each of the plurality of frames;
    a control circuit configured to be communicatively coupled to the camera and to the movable barrier operator, wherein the control circuit is configured to:
        receive a first frame of the plurality of frames from the camera;
        identify a stationary object in the first frame;
        define a ROI relative to the stationary object in the first frame;
        receive a second frame of the plurality of frames from the camera;
        identify the stationary object in the second frame;
        determine whether at least a portion of the ROI defined relative to the stationary object is outside of the second frame; and
        cause the movable barrier operator to enter a failsafe mode upon the at least a portion of the ROI defined relative to the stationary object being outside of the second frame.

2. The system of claim 1, wherein the control circuit is further configured to:
    identify, based on the first frame, a location of the stationary object within the first frame;
    identify, based on the second frame, a location of the stationary object within the second frame; and
    wherein the determination of whether the at least a portion of the ROI defined relative to the stationary object is outside of the second frame is based on a difference between the location of the stationary object within the first frame and the location of the stationary object within the second frame.

3. The system of claim 2, wherein the control circuit is further configured to:
    translate, based on the location of the stationary object within the first frame and the location of the stationary object within the second fame, the ROI between the first frame and the second frame.

4. The system of claim 3, wherein translation of the ROI includes at least one of a linear translation and a rotational translation.

5. The system of claim 1, wherein the stationary object is identified by at least one coordinate.

6. The system of claim 1, wherein determining whether the at least a portion of the ROI is outside of the second frame includes determining that the at least a portion of the ROI is outside of the second frame upon the ROI being within a threshold distance of a boundary of the second frame.

7. The system of claim 1, wherein the control circuit is configured to cause the movable barrier operator to enter the failsafe mode which includes at least one of:
    stopping the movable barrier;
    opening the movable barrier; and
    closing the movable barrier.

8. The system of claim 1, wherein the control circuit is further configured to:
    generate, based on causing the movable barrier operator to enter the failsafe mode, a notification, wherein the notification indicates that the failsafe mode has been entered; and
    cause communication of the notification to a user device.

9. A method for monitoring a region of interest ("ROI") with respect to a movable barrier operated by a movable barrier operator, the method comprising:
    at control circuit:
        receiving a first frame of a plurality of frames via a camera, the camera having a field of view ("FOV") that defines a boundary of each of the plurality of frames;
        identifying a stationary object in the first frame;
        defining a ROI relative to the stationary object in the first frame;
        receiving a second frame of the plurality of frames via the camera;
        identifying the stationary object in the second frame;
        determining whether at least a portion of the ROI defined relative to the stationary object is outside of the second frame; and
        causing the movable barrier operator to enter a failsafe mode upon the at least a portion of the ROI defined relative to the stationary object being outside of the second frame.

10. The method of claim 9, further comprising:
    identifying, by the control circuit based on the first frame, a location of the stationary object within the first frame;
    identifying, by the control circuit based on the second frame, a location of the stationary object within the second frame; and
    wherein the determining whether at least a portion of the ROI defined relative to the stationary object is outside of the second frame is based on the location of the stationary object within the first frame and the location of the stationary object within the second frame.

11. The method of claim 10, further comprising:
    translating, by the control circuit based on the location of the stationary object within the first frame and the location of the stationary object within the second frame, the ROI between the first frame and the second frame.

12. The method of claim 11, wherein the translating includes at least one of a linear translation and a rotational translation.

13. The method of claim 9, wherein the stationary object is identified by at least one coordinate.

14. The method of claim 9, wherein the determining whether the at least a portion of the ROI is outside of the second frame includes determining the at least a portion of the ROI is outside of the second frame upon the ROI being within a threshold distance of a boundary of the second frame.

15. The method of claim 9, wherein the causing the movable barrier operator to enter the failsafe mode includes at least one of:
   stopping the movable barrier;
   opening the movable barrier; and
   closing the movable barrier.

16. The method of claim 9, further comprising:
   generating, upon causing the movable barrier operator to enter the failsafe mode, a notification by the control circuit, wherein the notification indicates that the failsafe mode has been entered; and
   causing, by the control circuit, communication of the notification to a user device.

\* \* \* \* \*